United States Patent
Min et al.

(10) Patent No.: US 9,197,860 B2
(45) Date of Patent: Nov. 24, 2015

(54) COLOR DETECTOR FOR VEHICLE

(71) Applicant: Hyundai Motor Company, Seoul (KR)

(72) Inventors: Kyung-Moo Min, Eulwang-shi (KR);
Eun-Jin Choi, Eulwang-shi (KR);
Hyun-Jae Yoo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 582 days.

(21) Appl. No.: 13/672,376

(22) Filed: Nov. 8, 2012

(65) Prior Publication Data

US 2013/0169797 A1    Jul. 4, 2013

(30) Foreign Application Priority Data

Dec. 28, 2011 (KR) .......................... 10-2011-0144946

(51) Int. Cl.
*H04N 7/18*    (2006.01)
*G06K 9/00*    (2006.01)
*G06K 9/46*    (2006.01)

(52) U.S. Cl.
CPC .............. *H04N 7/18* (2013.01); *G06K 9/00805* (2013.01); *G06K 9/4647* (2013.01); *G06K 9/4652* (2013.01)

(58) Field of Classification Search
CPC ............ G06K 9/00805; G06K 9/4647; G06K 9/4652; H04N 7/18
USPC ........................................................ 348/135
See application file for complete search history.

(56) References Cited

FOREIGN PATENT DOCUMENTS

| KR | 10-2005-0065883 A | 6/2005 |
|----|-------------------|--------|
| KR | 10-2007-0012017 A | 1/2007 |
| KR | 10-2011-0001425 A | 1/2011 |

OTHER PUBLICATIONS

Sun et al.; His Color Model Based Lane-Marking Detection; Proceedings of the IEEE ITSC 2006, 2006 IEEE Intelligent Transportation Systems Conference, Toronto, Canada, Sep. 17-20, 2006.*
Tran et al.; An Adaptive Method for Lane Marking Detection Based on HSI Color Model; School of Electrical Engineering, Daehak-ro 102, South Korea.*

* cited by examiner

*Primary Examiner* — Jamie Atala
*Assistant Examiner* — James Boylan
(74) *Attorney, Agent, or Firm* — Morgan, Lewis & Bockius LLP

(57) ABSTRACT

A color detector for a vehicle that detects a color of an external image by receiving predetermined image data from a camera photographing the external image of the vehicle, may include an RGB converting unit converting a photographed image of the camera into RGB image data, an HSI (Hue, Saturation, and Intensity) image extracting unit extracting a hue image, a saturation image, and an intensity image of the RGB image data, a reverse image extracting unit extracting a reverse saturation image, a reverse modulo saturation image, and a reverse luminance image of the RGB image data, and a color detecting unit detecting white, black, red, and yellow colors by using two or more images selected from the hue image, the saturation image, the intensity image, the reverse saturation image, the reverse modulo saturation image, and the reverse luminance image by a predetermined algorithm.

8 Claims, 6 Drawing Sheets

COLOR DETECTOR FOR VEHICLE

CROSS-REFERENCE TO RELATED APPLICATIONS

The present application claims priority to Korean Patent Application No. 10-2011-0144946, filed on Dec. 28, 2011, the entire contents of which is incorporated herein for all purposes by this reference.

BACKGROUND OF THE INVENTION

1. Field of the Invention

The present invention relates to a color detector for a vehicle, and more particularly, to a color detector that increases a detection rate of an obstacle on a road which a vehicle travels by acquiring in real time color information of an image acquired by using a color camera installed in the vehicle.

2. Description of Related Art

In general, an obstacle detecting system with a radar sensor or an ultrasonic sensor is used for a travelling vehicle to detect an obstacle on a road.

However, since the obstacle detecting system with the radar sensor or the ultrasonic sensor is provided primarily in order to prevent a simple collision with the obstacle, the obstacle detecting system does not have a function to judge a type of the obstacle or a risk level of the obstacle.

That is, since the type and risk level of the obstacle cannot be identified by using only a distance measuring sensor such as the radar sensor or the ultrasonic sensor, a color and a form should be identified by using a camera.

In the case of the related art, as a system acquiring information on the road by using the camera of a vehicle, there are a lane definition warning system (LDWS) warning acquiring and warning lane information on the road and a lane keeping support (LKS) system keeping a lane.

However, as image information of the lane definition warning system (LDWS) and the lane keeping support (LKS) system, black and white images are used and since the black and white images use only edge and brightness information, only a limited object such as the lane can be detected.

That is, the LDWS and LKS systems of the vehicle are generally operated by using a mono camera, however, since the mono camera cannot almost use color information of an image, a limit thereof exists.

Therefore, in order to identify and judge the type and risk level of the obstacle on the road, an apparatus that can detect the obstacle by rapidly and easily detecting a color of the object on the road while using a color camera is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a color detector for a vehicle that easily acquires color information of image information acquired through a color camera of the vehicle in real time.

Further, various aspects of the present invention are directed to providing a color detector for a vehicle that can increasing an obstacle detection rate by using color information acquired in real time and identify a type of an obstacle and a risk level of the obstacle.

The technical problems achieved by the present invention are not limited to the foregoing technical problems. Other technical problems, which are not described, can clearly be understood by those skilled in the art from the following description of the present invention.

In an aspect of the present invention, a color detector for a vehicle that detects a color of an external image by receiving predetermined image data from a camera photographing the external image of the vehicle, may include an RGB converting unit converting a photographed image of the camera into RGB image data, an HSI (Hue, Saturation, and Intensity) image extracting unit extracting a hue image, a saturation image, and an intensity image of the RGB image data, a reverse image extracting unit extracting a reverse saturation image, a reverse modulo saturation image, and a reverse luminance image of the RGB image data, and a color detecting unit detecting white, black, red, and yellow colors by using two or more images selected from the hue image, the saturation image, the intensity image, the reverse saturation image, the reverse modulo saturation image, and the reverse luminance image by a predetermined algorithm.

The reverse modulo saturation image is acquired by using a reverse image and the saturation image.

In the detection of the white color, image data of a space where the saturation image and the intensity image are duplicated with each other is detected.

The black color is detected by excluding image data of a space where the hue image and the saturation image are duplicated with each other from image data of a space where the reverse modulo saturation image is stronger than the reverse luminance image.

In the detection of the red color, image data of a space where the hue image and the saturation image are duplicated with each other is detected.

The yellow color is detected by excluding the hue image from image data of a space where the saturation image and the reverse saturation image are duplicated with each other.

The color detector for the vehicle may further include a color gathering unit checking connectivities of the respective detected white, black, red, and yellow colors and removing or filling noise of each color.

The camera is a color camera that acquires the external image of the vehicle as a color image.

According to a color detector for a vehicle of the present invention, a preparation process for recognizing color information can be simplified and data processing can be rapidly performed, and as a result, color information of an external image of the vehicle can be easily acquired in real time.

Further, according to the present invention, stability can be guaranteed by performing data processing which is irrelevant to data variation influenced by light, and for example, since an intensity image which is the most sensitive to variation in illuminance caused by weather changes is used only for detecting white, a color which is resistant to an external environment can be detected.

In addition, according to the present invention, clustering of similar colors is easy and it is easy to acquire information of a color different from a color of a road surface through the clustering.

Furthermore, the size of an obstacle and a movement path can also be predicted by analyzing an area and a distribution of the color information different from the color of the road surface and when multiple colors are mixed in the same space, an identification rate of a predetermined obstacle is improved through pattern analysis.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
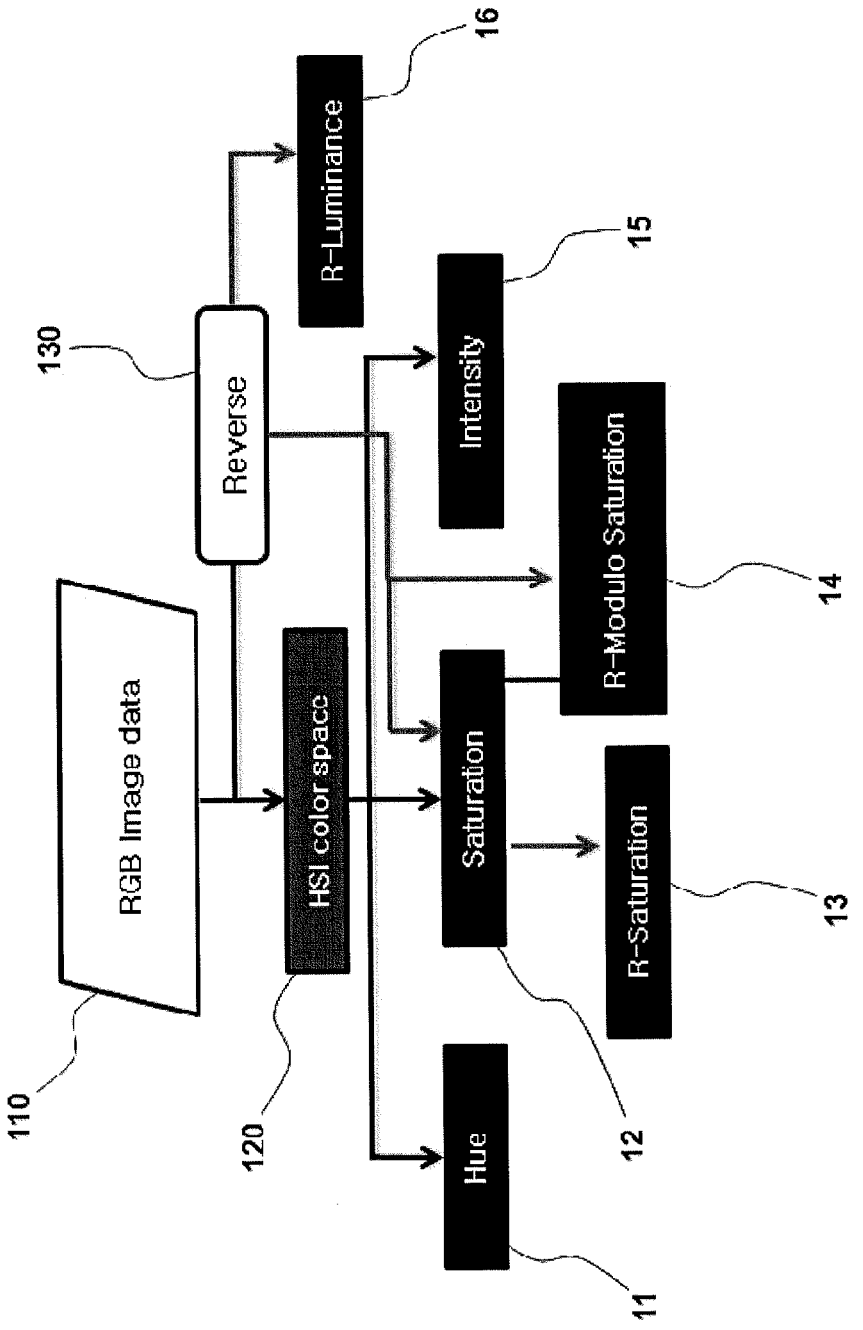
FIG. 1 is an exemplary diagram showing a color space formed by an HSI image extracting unit and an inversion image extracting unit of a color detector for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
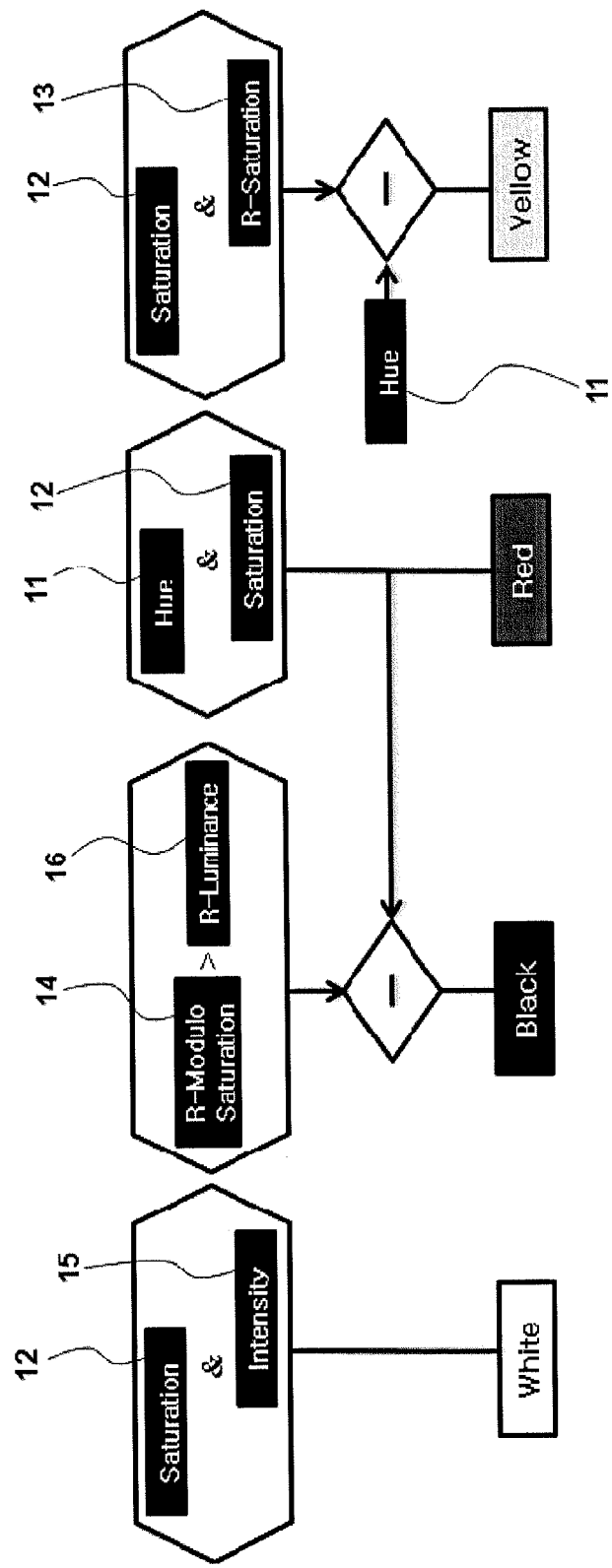
FIG. 2 is an exemplary diagram showing colors extracted by a color detecting unit of the color detector for a vehicle according to the exemplary embodiment of the present invention.

FIG. 1 is an exemplary diagram showing a color space formed by an HSI image extracting unit and an inversion image extracting unit of a color detector for a vehicle according to an exemplary embodiment of the present invention and FIG. 2 is an exemplary diagram showing colors extracted by a color detecting unit of the color detector for a vehicle according to the exemplary embodiment of the present invention.

The color detector for a vehicle according to the exemplary embodiment of the present invention may belong to an apparatus that receives predetermined image data from a camera photographing an external image of the vehicle to detect a color of the external image.

The color detector for a vehicle produces an HSI color and a reverse image by using RGB image data and thereafter, extracts primary colors by combining and comparing the HSI color and the reverse image and may serve to detect precise color information through a process of gathering the extracted colors.

To this end, the color detector for a vehicle according to the exemplary embodiment of the present invention may include an RGB converting unit 110 converting a photographed mage of a camera into RGB image data, an HSI image extracting unit 120 extracting a hue image, a saturation image, and an intensity image of the RGB image data, a reverse image extracting unit 130 extracting a reverse saturation image, a reverse modulo saturation image, and a reverse luminance image of the RGB image data, a color detecting unit detecting white, black, red, and yellow colors by using two or more images selected from the hue image, the saturation image, the intensity image, the reverse saturation image, the reverse modulo saturation image, and the reverse luminance image by a predetermined algorithm, and a color gathering unit checking connectivity of the respective detected white, black, red, and yellow colors and removing or filling noise of each color.

The RGB converting unit 110 serves to convert the external image of the vehicle photographed by the camera into the RGB image data and may also immediately convert an original image of the camera into the RGB image data.

In other words, since the present invention has an object for increasing a detection rate of an obstacle that exists on a road, it may be appropriate to acquire a position of the obstacle on a predetermined 3D coordinate from the original image of the camera by using an inverse perspective mapping (IPM) method and then convert the acquired image into the RGB image data.

The HSI image extracting unit 120 serves to extract a hue image 11, a saturation image 12, and an intensity image 15 of the RGB image data.

The reverse image extracting unit 130 serves to extract a reverse saturation image 13, a reverse modulo saturation image 14, and a reverse luminance image 16 of the RGB image data.

The reverse saturation image 13 may be acquired by reversing the original image and drawing a reversed saturation value and the reverse modulo saturation image 14 may also be acquired by using the reverse image and the saturation image 12.

As such, each color information is detected from a color detecting unit which is a predetermined color producing space by using six kinds of color factors extracted by the HSI image extracting unit 120 and the reverse image extracting unit 130.

The color detecting unit may include a predetermined color detecting algorithm and detects the white, black, red, and yellow colors, respectively, by using two or more images selected from the hue image 11, the saturation image 12, the intensity image 15, the reverse saturation image 13, the reverse modulo saturation image 14, and the reverse luminance image 16, by using the color detecting algorithm.

Referring to FIG. 2, a process of detecting information on the white, black, red, and yellow colors by combining or comparing the six kinds of color factors in the color detecting unit is shown.

The white color is detected by the color detecting unit by detecting image data of a space where the saturation image 12 and the intensity image 15 are duplicated with each other.

The black color may be detected by the color detecting unit by comparing the reverse modulo saturation image 14 and the reverse luminance image 16 to extract a space where the reverse modulo saturation image 14 is stronger than the reverse luminance image 16 and thereafter, excluding the image data of a space where the hue image 11 and the saturation image 12 are duplicated with each other.

In this case, the image data of the space where the hue image 11 and the saturation image 12 are duplicated with each other may be detected as the red color.

The yellow color may be detected by the color detector by extracting a space where the saturation image 12 and the reverse saturation image 13 are compared and duplicated with each other and thereafter, excluding the hue image.

Like this, in the exemplary embodiment of the present invention, the RGB image data is classified into six factors and then, the primary colors are detected through relatively simple comparison and combination, and as a result, the process is rapid and successive color information can be acquired.

Meanwhile, after the noise of each color is removed or filled by the color gathering unit and connectivity of a single color is checked, IDs for the respective colors are given to the white, black, red, and yellow color information detected by the color detecting unit, which is processed to more dedicate color information and thereafter, transmitted to a display unit to display the color information to a driver.

Figure 3A:
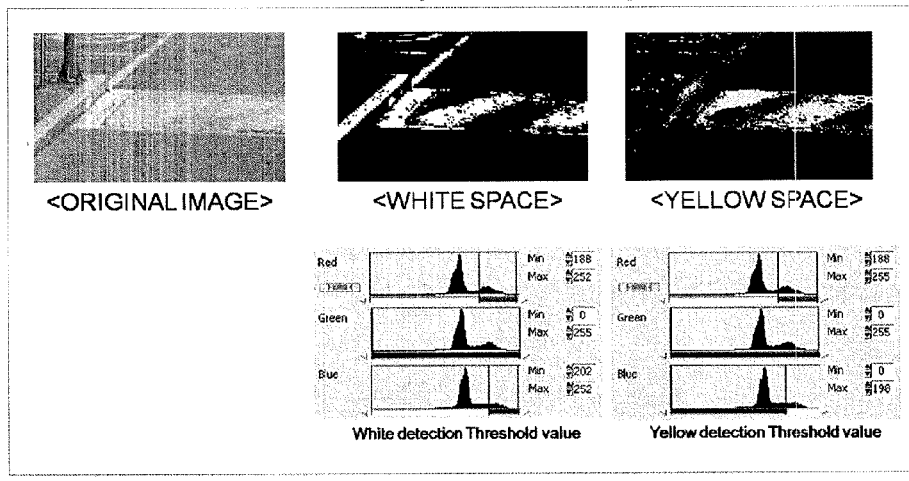
FIGS. 3A to 3B are exemplary diagrams showing image data for a predetermined color according to the related art.
Figure 3B:
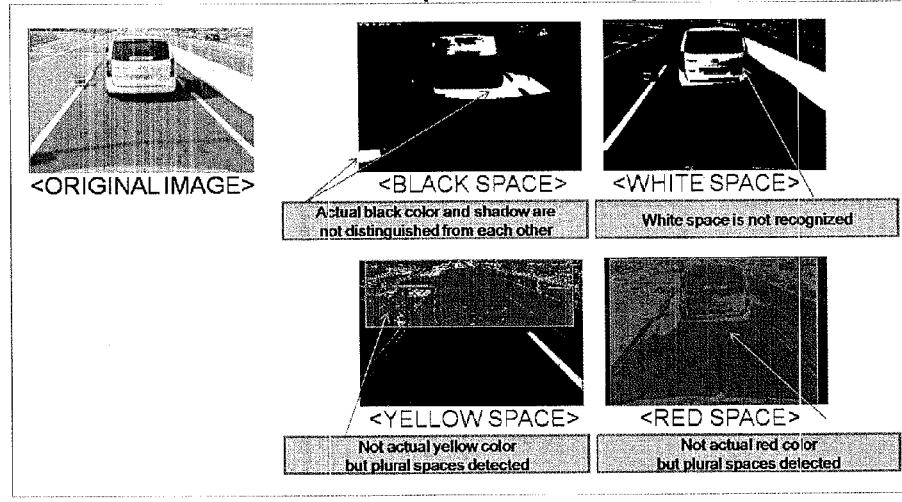

FIGS. 3A to 3B are exemplary diagrams showing image data for a predetermined color according to the related art.

FIGS. 3A to 3B show classification of colors based on a histogram of RGB images.

Referring to FIG. 3A, a white image and a yellow image are extracted from the original image of the camera through separation of a blue space of the histogram and the white image and the yellow image cannot be definitely distinguished from each other.

FIG. 3B shows extractions of a black image, a white image, a yellow image, and a red image from the original image of the camera, and it can be seen that in the case of the black image, an actual black color and a shadow generated by the vehicle are distinguished from each other and even in the case of the white image, a white space is not recognized.

It can be seen that, even in the case of the yellow image, there exists a space where a space which is not an actually yellow space is detected as the yellow color and even in the case of the red image, there exist a plurality of spaces where a space which is not an actually red space is detected as the red color.

As such, according to the method of classifying the colors based on the histogram of the RGB images in the related art, this method is sensitive to variation in illuminance and a plurality of error spaces are generated even in the color classification. The present invention is contrived to solve the problems.

FIGS. 4A to 4E are exemplary diagrams showing image data for a color detected by the color detector for a vehicle according to the exemplary embodiment of the present invention.

Figure 4A:
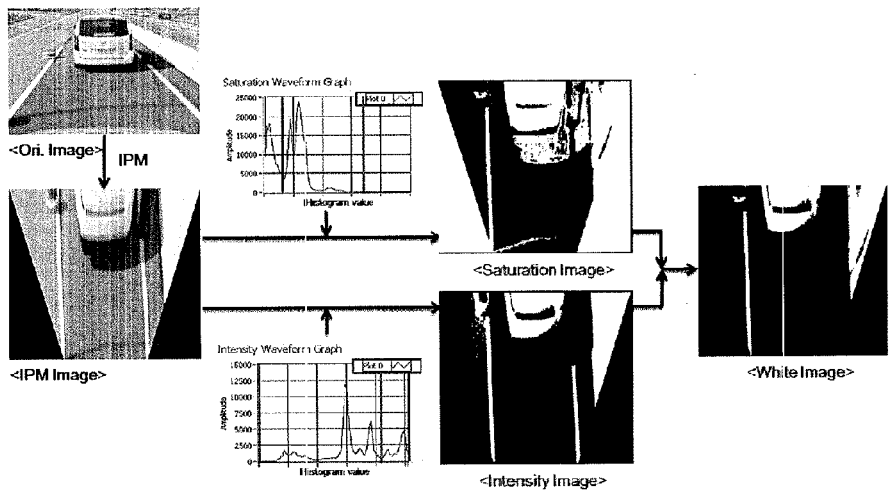
FIGS. 4A to 4E are exemplary diagrams showing image data for a color detected by the color detector for a vehicle according to the exemplary embodiment of the present invention.

FIG. 4A is an exemplary diagram showing a detection process for the white color detected by the color detector for a vehicle according to the exemplary embodiment of the present invention.

First, the original image of the camera is converted into an IPM image through inverse perspective mapping (IPM) type conversion. The IPM image may acquire the position of the obstacle on the 3D coordinate.

Subsequently, the saturation image and the intensity image are extracted by the HSI image extracting unit by using the RGB image data of the IPM image, respectively.

As one exemplary embodiment of extracting the saturation image and the intensity image, referring to a saturation waveform graph, the saturation image may be extracted by outputting data of a space between 0 and a point having the smallest wave size within the range of 0 to 20 (time).

Similarly, referring to an intensity waveform graph, the intensity image may be extracted by outputting data of a space between the point having the smallest wave size and 256 (histogram value) within the range of 200 to 256 (histogram value).

The color detecting unit merges the saturation image and the intensity image acquired as above with each other to detect the white image.

Referring to FIG. 4A, in the white image by the present invention, the white space which cannot be recognized is not provided unlike the method of classifying the colors based on the histogram in the related art.

Figure 4B:
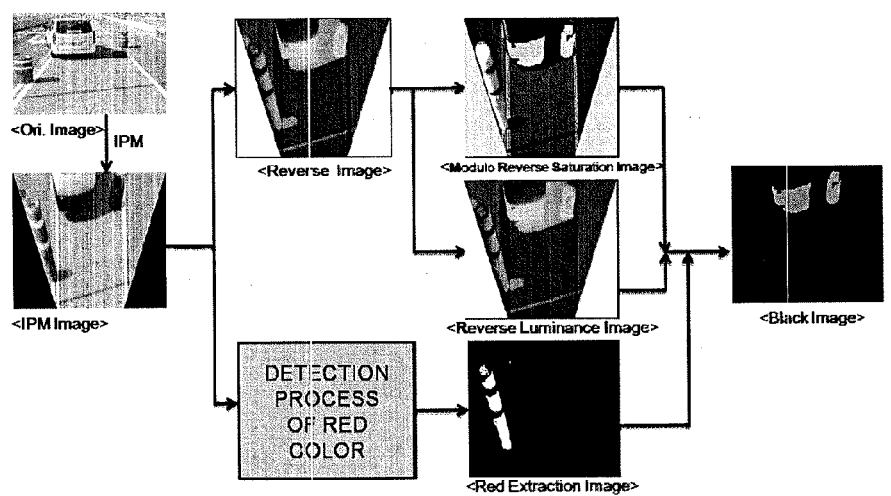

FIG. 4B is an exemplary diagram showing a detection process for the black color detected by the color detector for a vehicle according to the exemplary embodiment of the present invention.

First, the original image of the camera is converted into the IPM image through the inverse perspective mapping (IPM) type conversion and subsequently, the reverse modulo saturation image and the reverse luminance image are extracted by using the reverse image in the reverse image extracting unit with the RGB image data of the IPM image.

Subsequently, a space where the reverse modulo saturation image is displayed to be stronger than the reverse luminance image is extracted in the color detecting unit.

Thereafter, in the space where the reverse modulo saturation image is displayed to be stronger than the reverse luminance image, the black image is detected except for the red image generated by merging the hue image and the saturation image.

Referring to FIG. 4A, in the case of the red image according to the exemplary embodiment of the present invention, it can be seen that the actual black color and the shadow generated by the vehicle may be distinguished from each other unlike the method of classifying the colors based on the histogram in the related art.

Figure 4C:
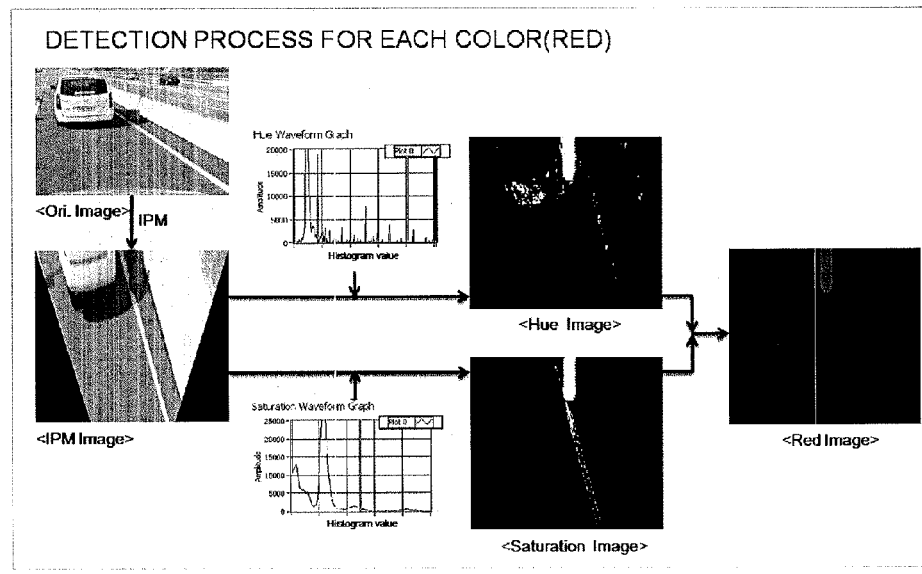

FIG. 4C is an exemplary diagram showing a detection process for the red color detected by the color detector for a vehicle according to the exemplary embodiment of the present invention.

First, the original image of the camera is converted into the IPM image through the inverse perspective mapping (IPM) type conversion and subsequently, the hue image and the saturation image are extracted in the HSI image extracting unit by using the RGB image data of the IPM image, respectively.

As one exemplary embodiment of extracting the hue image and the saturation image, referring to a hue waveform graph, the hue image may be extracted by outputting data of a space of 200 (histogram value) or more.

Similarly, referring to the saturation waveform graph, the saturation image may be extracted by outputting data of a space of 45 (histogram value) or more.

The hue image and the saturation image acquired as above are merged with each other in the color detecting unit to detect the red image.

Referring to FIG. 4B, it can be seen that, in the case of the black image according to the exemplary embodiment of the present invention, there does not exist a space where a space which is not the actually red space is detected as the red color unlike the method of classifying the colors based on the histogram in the related art.

Figure 4D:
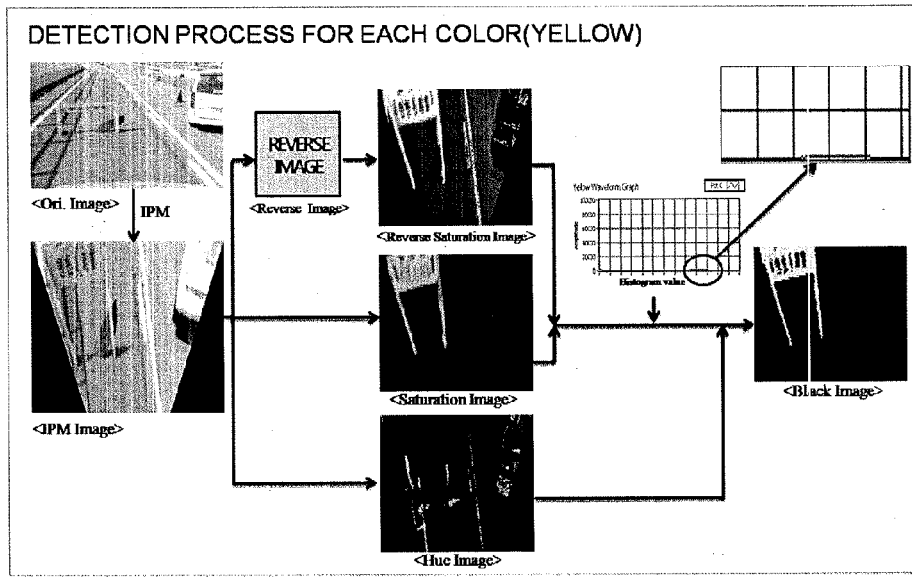

FIG. 4D is an exemplary diagram showing a detection process for the yellow color detected by the color detector for a vehicle according to the exemplary embodiment of the present invention.

First, the original image of the camera is converted into the IPM image through the inverse perspective mapping (IPM) type conversion and subsequently, the hue image and the saturation image are extracted in the HSI image extracting unit by using the RGB image data of the IPM image, respectively.

The reverse saturation image is extracted in the reverse image extracting unit by using the RGB image data of the IPM image.

Thereafter, after only the duplication space of the reverse saturation image and the saturation image is extracted, the yellow image is detected except for the hue image.

Referring to FIG. 4D, it can be seen that, in the case of the yellow image according to the exemplary embodiment of the present invention, there does not exist a space where a space which is not the actually yellow space is detected as the yellow color is not provided unlike the method of classifying the colors based on the histogram in the related art.

Figure 4E:
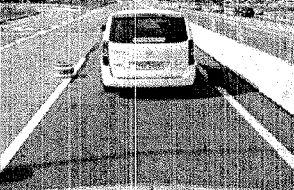

FIG. 4E is a comparison diagram showing an original image, an RGB image, and a detection image by a camera for each color.

As such, according to the color detector for a vehicle of the exemplary embodiment of the present invention, since the color information is rapidly acquired by using the original image of the camera and the IPM image, a preparation process for recognizing the color information can be simplified and data can be rapidly processed.

Since the intensity image which is the most sensitive to variation in illuminance is used only for detecting the white, a color which is resistant to an external environment may be detected and since a similar color is easily clustered, information of a color different from a color of a road surface may be easily acquired.

According to the exemplary embodiment of the present invention, when multiple colors are mixed in the same space, like i) a road sign configured by the red, blue, white, and black colors, ii) a speed bump configured by the yellow, white, and black colors, iii) a tripod configured by the red and white colors and a road lane configured by the white, yellow, and blue colors, and iv) a construction sign guard configured by the yellow and red colors, an identification rate of a predetermined obstacle can be maximized through pattern analysis.

Colors other than the above-mentioned red, blue, white, and black may also be detected in a similar method as above. When a user selects a color which the user wants to detect, a plurality of colors other than the four colors may also be detected simultaneously. However, when the colors are clustered, the user needs to separate the same color space by setting a parameter with respect to whether light red and dark red are included.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A color detector for a vehicle that detects a color of an external image by receiving predetermined image data from a camera photographing the external image of the vehicle, comprising;
   an RGB converting unit converting a photographed image of the camera into RGB image data;
   an HSI (Hue, Saturation, and Intensity) image extracting unit extracting a hue image, a saturation image, and an intensity image of the RGB image data;
   a reverse image extracting unit extracting a reverse saturation image, a reverse modulo saturation image, and a reverse luminance image of the RGB image data; and
   a color detecting unit detecting white, black, red, and yellow colors by using two or more images selected from the hue image, the saturation image, the intensity image, the reverse saturation image, the reverse modulo saturation image, and the reverse luminance image by a predetermined algorithm.

2. The color detector for the vehicle of claim 1, wherein the reverse modulo saturation image is acquired by using a reverse photographed image and the saturation image.

3. The color detector for the vehicle of claim 1, wherein in the detection of the white color, image data of a space where the saturation image and the intensity image are duplicated with each other is detected.

4. The color detector for the vehicle of claim 1, wherein the black color is detected by excluding image data of a space where the hue image and the saturation image are duplicated with each other from image data of a space where the reverse modulo saturation image is stronger than the reverse luminance image.

5. The color detector for the vehicle of claim 1, wherein in the detection of the red color, image data of a space where the hue image and the saturation image are duplicated with each other is detected.

6. The color detector for the vehicle of claim 1, wherein the yellow color is detected by excluding the hue image from image data of a space where the saturation image and the reverse saturation image are duplicated with each other.

7. The color detector for the vehicle of claim 1, further including:
   a color gathering unit checking connectivities of the respective detected white, black, red, and yellow colors and removing or filling noise of each color.

8. The color detector for the vehicle of claim 1, wherein the camera is a color camera that acquires the external image of the vehicle as a color image.

* * * * *